United States Patent [19]
Jaegers et al.

[11] 3,745,625
[45] July 17, 1973

[54] JOINTED ROLLER

[75] Inventors: Heinz Jaegers, Duisburg-Buchholz; Horst Quenter, Kaarst, both of Germany

[73] Assignee: Joseph Eck & Sohne, Dusseldorf-Heerdt, Germany

[22] Filed: July 2, 1971

[21] Appl. No.: 159,177

[30] Foreign Application Priority Data
July 8, 1970   Germany.................... P 20 33 740.0
Feb. 24, 1971   Germany.................... P 21 08 702.5

[52] U.S. Cl............................................ 29/116 AD
[51] Int. Cl............................................. B21b 13/02
[58] Field of Search .................... 29/116 R, 116 AD, 29/125; 26/63

[56] References Cited
UNITED STATES PATENTS
2,261,740  11/1941  Makarius .......................... 29/116 R
2,745,134  5/1956  Collins ...................... 29/116 R UX
2,817,940  12/1957  Lorig.............................. 29/116 R X
2,996,784  8/1961  Young ..................................... 26/63
3,308,519  3/1967  Westgate....................... 29/116 R X
3,389,450  6/1968  Robertson...................... 29/116 AD FOREIGN PATENTS OR APPLICATIONS
893,426  4/1962  Great Britain ................ 29/116 AD

*Primary Examiner*—Alfred R. Guest
*Attorney*—Frederick E. Lange et al.

[57] ABSTRACT

A jointed or bendable roller adapted to be used, among other things, as a full-width roller in a calender in order to prevent folds, fluttering edges, and undulations in web material, such as paper, by stretching widthwise, said roller having at least two roller shells which are rotatably mounted on a straight roller shaft and which are set at an angle to each other. The roller further includes means for adjusting the degree or amount of bending between adjacent roller shells.

9 Claims, 3 Drawing Figures

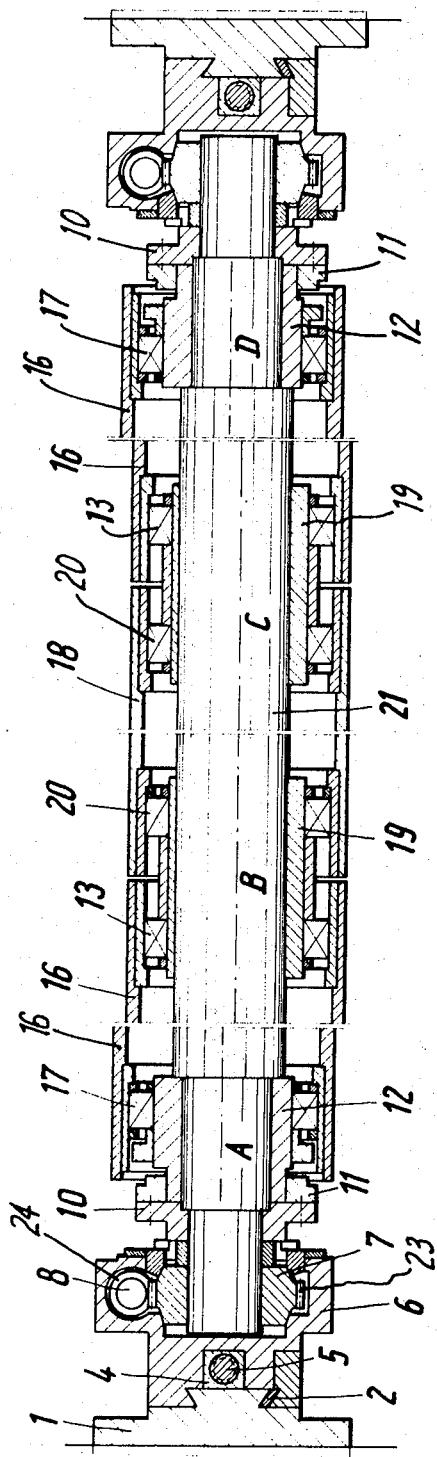
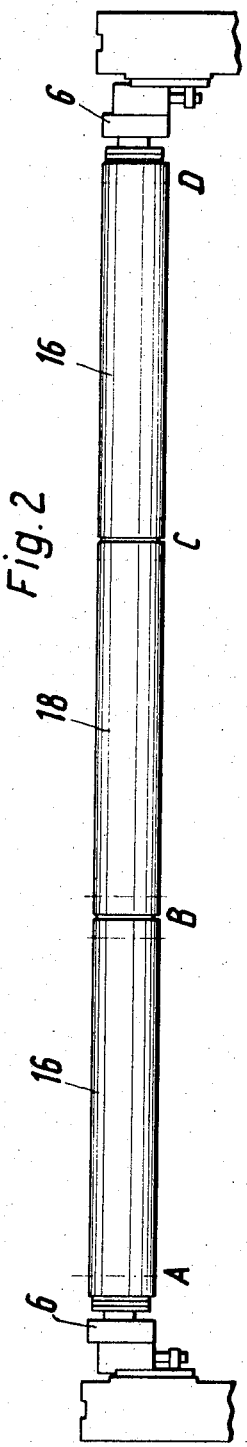

JOINTED ROLLER

BACKGROUND OF THE INVENTION

This invention relates generally to an improved jointed or bendable roller, and more specifically, to an improved jointed or bendable roller having at least tow roller tubes of equal outside diameter which are separated from each other by a small gap, which lie axially side by side, and which are rotatably mounted onto a common supporting shaft. In the past, jointed or bendable rollers had been used, among other things, as paper deflecting rollers in a calender. The function of the rollers when used in this manner was to compensate for the negative sag caused by the pull of the paper web. The negative sag could, of course, be compensated by cambered rollers having an upward arch in the middle, however, cambered rollers had the disadvantage, as compared with jointed rollers, that due to their greater mass they tended to cause disturbing vibrations at relatively high speeds of rotation, and due to their larger circumference, required too much space in the interstices between the calender rollers and the operating support mechanism, which, under ideal conditions, should be as small as possible.

Conventional jointed or bendable rollers of the past normally included an inner, fixed supporting shaft and a plurality of roller tubes or shells mounted on the supporting shaft and lying axially side by side with respect to each other. The roller shells, normally, were either mounted onto the supporting shaft eccentrically in the middle zone and concentrically in the outer zone, or concentrically in the middle zone and eccentrically in the outer zone. These prior jointed or bendable rollers, however, had the primary disadvantage that the degree of bending or buckling of the rollers was not adjustable.

SUMMARY OF THE INVENTION

In contrast to the jointed or bendable rollers of the prior art, the present invention describes an improved jointed or bendable roller in which the degree or amount of bending of the various roller shells or tubes with respect to each other is adjustable. More specifically, the device of the present invention includes a supporting shaft about which is mounted a plurality of roller tubes which are mounted at an angle with respect to each other and which are rotatably mounted with respect to the main supporting shaft. Further included in the preferred embodiment of the present invention is a means located at each end of the supporting shaft for adjusting the height of various portions of the roller tubes, and thus, for adjusting the degree or amount by which the various roller tubes may be bent or angled with respect to each other. In one of the embodiments of the present invention, this adjustment is accomplished by mounting the various roller tubes or shelves about the supporting shaft by means of a plurality of eccentrics integrally joined with the supporting shaft wherein the specific height of any portion of the roller tube could be adjusted by rotation of the main supporting shaft. The adjustment could also be accomplished by using eccentrics which are rotatable with respect to the shaft and only rotating the eccentrics. In another embodiment of the present invention, the adjustment of the amount by which the various roller shells may be bent with respect to each other may be accomplished by means of a bearing carriage located at each end of the supporting shaft which are adjustable radially with respect to the supporting shaft. With this type of construction, the two ends of the jointed or bendable roller may be moved upwardly or downwardly with respect to the center portions of the roller to thereby attain the desired amount of bending.

Consequently, it is an object of the present invention to provide an improved jointed or bendable roller in which the degree or amount by which the various roller shells or tubes may be bent with respect to each other is adjustable.

Another object of the present invention is to provide an improved jointed or bendable roller having a plurality of roller tubes in which at least the outer ends of the two outer roller tubes are supported on self-aligning bearings whose positions are adjustable relative to the supporting shaft to thereby selectively vary the inflection of the jointed or bendable roller.

These and other objects of the present invention will become apparent by reference to the drawings, the description of the preferred embodiment and to the appended claims.

DESCRIPTION OF THE DRAWINGS

FIG. 1 is a front view, partially in section, of a first embodiment of a device embodying the present invention showing specifically, sections A, B, C and D of FIG. 2.

FIG. 2 is a front view of the embodiment of FIG. 1.

DESCRIPTION OF THE PREFERRED EMBODIMENT

Figure 3:
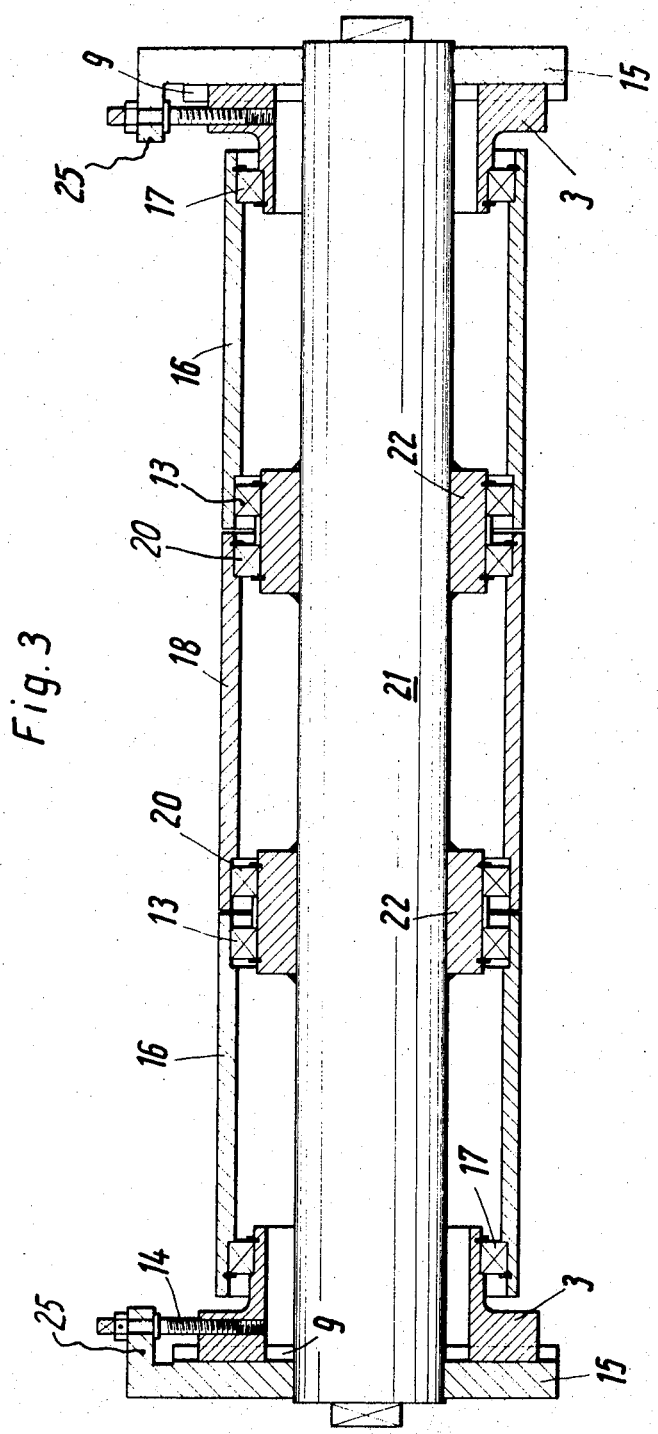
FIG. 3 is a front view, partially in section, of an alternative embodiment of a device embodying the present invention.

Referring first to FIG. 1, the jointed or bendable roller of the present invention includes a centrally located, fixed supporting shaft 21 which extends internally through the bendable roller, and a plurality of roller tubes or shells 16 and 18 mounted about the centrally located supporting shaft 21. As shown best with reference also to FIG. 2, FIG. 1 is an illustration in which a substantial portion of the supporting shaft 21 and the roller shells 16 and 18 have been deleted. In fact, the only portions of the roller which are shown in FIG. 1 are the portions designated as A, B, C and D in FIG. 2. Referring again to FIG. 1, the bendable roller of the preferred embodiment specifically includes three roller shells or tubes 16, 16 and 18. Two of the roller shells, indicated by the reference numeral 16, are adjacent to the ends of the roller and extend toward the middle. The third roller shell, indicated by reference numeral 18, is mounted near the middle of the shaft 21 and intermediate between the two end roller shells 16 so that there is a small gap between each of the roller tubes.

The two peripheral ends of the center roller shell 18 are mounted about the supporting shaft 21 by a pair of non-rotational, non-adjustable eccentrics 19, 19 and by a pair of self-aligning roller bearings 20, 20 which are disposed between the outer surface of the pair of eccentrics 19, 19 and the inner surface of the central roller shell 18 to permit relatively free rotational movement of the center roller shell 18 about the fixed supporting shaft 21. One of the eccentrics 19 is securely mounted to the supporting shaft 21 at the point B and the other eccentric 19 is securely mounted to the supporting shaft 21 at the point C. As shown, each of the eccentrics 19 are eccentrically positioned about the shaft 21 so that the axial center of each of the members 19 is different from the axial center of the shaft 21. As shown in FIG. 1, the portion of each of the eccentrics 19 above the shaft 21 is substantially smaller than the portion of each of the eccentrics 19 disposed below the shaft 21. Because the eccentrics 19 are fixedly secured to the shaft 21, rotation of the shaft 21 also causes the eccentrics 19 to be rotated, thereby changing the positions of the eccentrics 19. For example, if the shaft 21 was rotated 180°, the large portion of the eccentrics 19 would be located at the top of the shaft 21 as viewed in FIG. 1 and the small portion of the eccentrics would be disposed below the shaft 21.

Disposed against the outer surface of each of the eccentrics 19 is a self-aligning roller bearing 20 which is designed to engage the inner surface of the peripheral ends of the center roller shell 18. The center roller shell 18 is thereby freely rotatable about the eccentrics 19 and about the supporting shaft 21.

The centrally located or inner ends of the two outer roller tubes or shells 16 are likewise rotatably mounted with respect to the supporting shaft 21 and with respect to the eccentrics 19 by a pair of self-aligning roller bearings 13, 13. One of the pair of roller bearings 13 is associated with each eccentric 19 and with each inner end of the two outer roller tubes 16. The self-aligning feature of the roller bearings 13 enable the outer ends of the roller tubes 16 to be slightly moved relative to the inner ends without causing the bearings 13 to bind.

The peripheral or outer ends of the two outer roller tubes 16 are similarly mounted to the supporting shaft 21 by a pair of eccentrics 12, 12 and a pair of self-aligning roller bearings 17, 17. In contrast to the eccentrics 19, each of the eccentrics 12 is rotatably mounted on the supporting shaft 21. As a result, the eccentrics 12 may be rotated with respect to the supporting shaft 21 or the shaft 21 may be rotated with respect to the eccentrics 12. In actual construction, the eccentrics 12 comprise a rotatable bushing having a cylindrical inner face or surface and a cylindrical outer face or surface which are eccentrically positioned with respect to each other. As shown in the drawings, one of the eccentrics is rotatably mounted to the shaft 21 at one end of the shaft, generally indicated by the letter A, and the other eccentric 12 is rotatably mounted to the shaft 21 at a point generally indicated by the letter D. As in the case of the pair of eccentrics 19, the axial center of the eccentrics 12 is different than the axial center of the shaft 21. Likewise, a different amount of the eccentric extends above the shaft 21 than extends below the shaft 21. Thus, by rotating the eccentrics 12, the relative position of the various portions of the eccentrics 12 with respect to the axial center of the shaft 12 may be varied. Disposed on the outside surface of each of the eccentrics 12 is a self-aligning roller bearing 17 which is also designed to engage the inner surface of the peripheral or outer ends of the roller shells 16. As in the case of the roller bearings 13, the self-aligning feature of the bearings 17 permits the ends of the roller shells 16 to be slightly moved with respect to each other without causing the bearings 17 to bind. This specific construction also permits the roller shells 16 to be freely rotated with respect to the supporting shaft 21 and with respect to the eccentrics 12.

Each of the rotatable eccentrics 12 are further associated with a pair of holding rings 10 and 11 which are rotatable relative to each other and which are also capable of being fixed with respect to each other. One of the holding rings 11 is fixedly secured to the rotatable eccentric 12 and the other holding ring 10 is fixedly secured and mounted to the supporting shaft 21. Consequently, if the pair of holding rings 10 and 11 are fixed with respect to each other, the eccentric 12 may be rotated by rotating the supporting shaft 21. In such an arrangement, the rotation of the shaft 21 causes the holding ring 10 to rotate which in turn causes the holding ring 11 and the eccentric 12 to rotate. Also, when the holding rings 10 and 11 are not fixed to each other, the supporting shaft 21 may be rotated without rotation of the eccentric 12.

On each end of the supporting shaft 21 is secured a member 7 which comprises a portion of a worm gear arrangement. The outer periphery of the member 7 is generally circular and includes an extreme outer portion 23 which includes alternate grooves and ridge portions which may appropriately be called threads of the member 7. This portion 23 is also referred to as the worm gear rim. A worm 8 having a peripheral threaded portion 24 including alternate grooves and ridges is positioned adjacent the peripheral edge of the member 7 so that the alternate grooves and ridges of the rim portion 23 engage the alternate grooves and ridges of the threaded periphery 24. Thus, by rotating the worm 8, the peripheral rim portion 23 of the member 7 is advanced, thereby causing the supporting shaft 21 to rotate. The member 7 and the worm 8 are both contained in a worm housing 6 which by a conventional dovetail guide and a tongue 2 is fastened to a pedestal 1. The housing 6 may be secured to the pedestal 1 or displaced from the pedestal 1 by the adjusting spindle 5 and a round nut 4.

The operation of the device illustrated in FIGS. 1 and 2 can be summarized as follows: Under normal operating conditions, the eccentrics 12, 12 and 19, 19 are positioned in a manner so that the roller shells 16 and 18 are disposed at a desirable angle with respect to each other. This angle, of course, would depend upon the purpose for which the jointed or bendable roller is being used. If a different angle between adjacent roller shells is desired, the holding rings 10 and 11 are disengaged so that the holding ring 11 and thus the eccentrics 12 may be rotated relative to that of the holding member 10 and thus the shaft 21. Then, the eccentrics 12 are rotated until the desired angle between adjacent roller shells or the desired curvature of the roller is attained. With this rotation, however, the position of the crest of the roller curvature is also varied. To compensate for this, the holding members 10 and 11 are secured to each other so that they rotate in unison and the supporting shaft 21 and hence the entire roller is rotated by the worm 8 until the crest is brought back to its desired position. With this construction, the curvature of the roller may be continuously adjusted within certain end limits. These limits, of course, are determined by the characteristics of the two pair of eccentrics 19, 19 and 12, 12.

Referring now to FIG. 3 which illustrates an alternative embodiment of the present invention, it can be seen that the general structure of the device is very similar to that shown in FIG. 1. More specifically, the embodiment shown in FIG. 3 also includes a fixed supporting shaft 21 about which are mounted a plurality of roller tubes or shells 16, 16 and 18. As in FIGS. 1 and 2, reference numeral 18 indicates the centrally located roller shell and reference numerals 16 indicate the two outer roller shells. The two ends of the center roller shell 18 are mounted with respect to the supporting shaft 21 via the members 22 and the self-aligning roller bearing 20. The members 22 are securely connected with the shaft 21. In actual construction, the members 22 are concentric with their axial center concentric with the axial center of the shaft 21. Disposed between the outer surface of the members 22 and the intersurface of the roller shell 18 are a pair of self-aligning roller bearings 20. These bearings permit the roller shell 18 to rotate freely with respect to the members 22 and with respect to the supporting shaft 21.

Similarly, the central or inner ends of the pair of outer roller shells 16, 16 are supported with respect to the shaft 21 by the pair of members 22, 22 and by a pair of self-aligning roller bearings 13, 13 disposed between the outer surface of the members 22 and the inner surface of the roller shell 16. The outer or peripheral ends of the roller shells 16, 16 are supported with respect to the shaft 21 by an adjustable bearing carriage 3 and by a pair of self-aligning roller-bearings 17 disposed between the outer surface of the bearing carriage 3 and the inner surface of the roller shell 16. As in the embodiment illustrated in FIGS. 1 and 2, the self-aligning roller bearings 20, 13 and 17 permit the two ends of any one roller shell 16 or 18 to be moved relative to the other end without causing the bearings to bind.

For adjustment of the device illustrated in FIG. 3, there is threadedly advanced into the bearing carriage 3 a set screw 14 which is held by an overhanging portion 25 of the pedestal 15. By rotating the set screw 14, the bearing carriages 3 may be adjusted in a radial direction with respect to the supporting shaft 21. As shown in FIG. 3, the adjustment would be along a straight guide member 9 which is integrally formed with the pedestal 15. The pedestal 15 may also be designed so that it is rotationally adjustable about an axis parallel to the axis of the supporting shaft 21 in a manner which is not shown in the illustrations. In such a device, however, it would be possible to rotate either only the bearing carriages 3, or, if the supporting shaft 21 was securely fastened to the pedestal 15, the entire roller including the supporting shaft 21 and the inner members 22 by rotation of the pedestal 15. In a case where the supporting shaft 21 is rotationally mounted and the pedestal 15, the central roller shell 18 and the inner end of the outer roller tubes 16 may be mounted eccentrically as in the embodiment illustrated in FIGS. 1 and 2. Then the inner eccentrics, the members 22, could be adjusted by a rotation of the supporting shaft 21.

The alternative embodiment which is illustrated in FIG. 3 has the specific advantage over the embodiment illustrated in FIGS. 1 and 2 in that upon adjustment of the bearing carriages 3, the crest of the roller curvature does not rotate or vary. Because of this, the jointed or bendable roller of the present invention may be enveloped or inverted 180° and can also be adjusted very easily. In both embodiments, it is possible to omit the middle roller tube or shell 18 so that the outer roller tubes 16 are separated from each other only by a small gap. It is further possible also to arrange more than three roller tubes on the supporting shaft 21.

Although the description of the two illustrated embodiments of the present invention has been quite specific, it is contemplated that other embodiments and changes may be made to the described embodiments without deviating from the teachings or spirit of the present invention. Consequently, it is intended that the scope of the present invention be dictated by the appended claims rather than by the description of the preferred embodiment.

We claim:

1. A jointed roller having means for changing the inflection thereof comprising:
   a centrally disposed supporting shaft adapted for selective rotational movement;
   at least two roller tubes of substantially equal outside diameter rotatably mounted with respect to said supporting shaft, said roller tubes being bendable with respect to each other and aligned axially side by side with adjacent roller tubes separated from each other by a small gap and said roller tubes including an outer roller tube at each end thereof, each of said outer roller tubes having an inner and an outer end and each being supported by
   a first support means including a first eccentric connected with said supporting shaft and a first self-aligning bearing means disposed between said first eccentric and said outer roller tube for rotatably supporting the inner end of said outer roller tube and
   a second support means including a second eccentric connected with said supporting shaft and a second self-aligning bearing means disposed between said second eccentric and said outer roller tube for rotatably supporting the outer end of said outer roller tube, the angular position of said first and second eccentrics about said supporting shaft being adjustable with respect to each other and the angular position of at least one of said first and second eccentrics being adjustable with respect to said supporting shaft.

2. The jointed roller of claim 1 wherein the angular position of said second eccentric is adjustable with respect to said supporting shaft.

3. The jointed roller of claim 1 having means for rotating said supporting shaft about its longitudinal axis.

4. The jointed roller of claim 3 wherein said means for rotating said supporting shaft includes a worm gear.

5. The jointed roller of claim 1 wherein said first eccentric is fixedly secured to said supporting shaft.

6. The jointed roller of claim 5 having means for adjusting the angular position of said second eccentric with respect to said supporting shaft.

7. The jointed roller of claim 6 having securing means for selectively securing said second eccentric to said supporting shaft for rotation therewith.

8. The jointed roller of claim 7 wherein said securing means is a holding ring selectably securable to said second eccentric.

9. The jointed roller of claim 5 having means for selectively rotating said supporting shaft about its longitudinal axis.

* * * * *